(12) United States Patent
Glugla

(10) Patent No.: US 11,421,614 B1
(45) Date of Patent: Aug. 23, 2022

(54) METHODS AND SYSTEMS FOR INCREASING CATALYST TEMPERATURE

(71) Applicant: Ford Global Technologies, LLC, Dearborn, MI (US)

(72) Inventor: Chris Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/443,931

(22) Filed: Jul. 28, 2021

(51) Int. Cl.
  *F02D 41/06* (2006.01)
  *F02D 41/02* (2006.01)
  *F02P 5/15* (2006.01)
  *F02D 33/00* (2006.01)
  *F02D 13/02* (2006.01)

(52) U.S. Cl.
  CPC ....... *F02D 41/024* (2013.01); *F02D 13/0242* (2013.01); *F02D 33/00* (2013.01); *F02P 5/15* (2013.01); *F02D 2200/70* (2013.01)

(58) Field of Classification Search
  CPC .... F02D 41/024; F02D 13/0242; F02D 33/00; F02D 2200/70; F02P 5/15

USPC ........ 123/179.3, 179.4, 676, 685, 299, 300, 123/481; 701/103–105
See application file for complete search history.

(56) References Cited

U.S. PATENT DOCUMENTS

| | | |
|---|---|---|
| 7,832,197 B2 | 11/2010 | Leone |
| 8,392,091 B2 | 3/2013 | Hebbale et al. |
| 10,450,930 B2 | 10/2019 | Smith et al. |
| 2011/0283688 A1 | 11/2011 | Yuda |
| 2018/0149059 A1 | 5/2018 | Fröberg et al. |

FOREIGN PATENT DOCUMENTS

WO  2017127219 A1  7/2017

*Primary Examiner* — Hai H Huynh
(74) *Attorney, Agent, or Firm* — Vincent Mastrogiacomo; McCoy Russell LLP

(57) ABSTRACT

Methods and systems are provided for increasing a catalyst temperature prior to entering a vehicle mode where combustion is temporarily discontinued. In one example, a method for increasing a temperature of an emission control device before a transient fuel shut-off (TFSO) event of an engine via a spark timing adjustment and an exhaust valve opening timing adjustments. Adjustments of the spark timing and the exhaust valve opening timing may change depending on whether a transient fuel shut off event of an auto-stop event occurs.

20 Claims, 5 Drawing Sheets

METHODS AND SYSTEMS FOR INCREASING CATALYST TEMPERATURE

FIELD

The present description relates generally to methods and systems for controlling a vehicle engine during a fuel cut condition.

BACKGROUND/SUMMARY

Vehicle engines may be configured to shut down during idle conditions when the vehicle comes to a stop while a brake is applied and restarted once the brake is released (e.g., a stop-start system) in order to reduce fuel consumption. For example, the engine may be automatically stopped when driver demanded torque is low to conserve fuel and restarted with assistance from a starting device when demanded based on variations in vehicle conditions or a detection of an engine restart request, such as from operator input (e.g., an accelerator pedal tip-in). Stop-start technology may increase fuel economy and reduce emissions by temporarily stopping combustion at the engine.

Additionally, in vehicles having internal combustion engines, it can be advantageous to discontinue fuel injection to all or some of the engine cylinders during certain operating conditions, such as during vehicle deceleration or braking. For example, one or more cylinder fuel injectors may be selectively deactivated while the engine is rotating. Such an operation is also known as a transient fuel shut off event. Increasing the number of cylinders that are deactivated and/or the amount of time the cylinders are deactivated increases the fuel economy of the vehicle.

However, during an engine shut down or transient fuel shut off condition, an emissions after treatment system (e.g., a three-way catalyst) temperature may decrease below a catalyst light off temperature (e.g., temperature at which catalyst reactions may occur). As such, once the engine is fired again, the engine would produce more emissions since the after treatment system is not at full operating temperature and efficiency.

Other attempts to address catalyst cooling during a fuel cut condition include increasing the catalyst temperature before operating the engine for a fuel cut condition. One example approach is shown by Yuda in U.S. 2011/0283688 A1. Therein, a catalyst temperature is estimated before a fuel cut off event occurs. If the catalyst temperature is less than a temperature threshold, ignition timing is delayed to increase the temperature of the catalyst.

However, the inventors herein have recognized that the approach of Yuda may be inefficient and inaccurate. As one example, retarding the ignition timing alone may result in lower temperature increases versus approaches that synergistically adjust a plurality of operating parameters to increase the temperature of the catalyst. As another example, comparing the catalyst temperature to a fixed threshold temperature may result in heating the catalyst more than it will cool during a relatively short fuel cut off event, which may decrease fuel economy. Additionally, comparing the catalyst temperature to a fixed threshold temperature may result in not heating the catalyst enough for the cooling that may occur during a relatively long fuel cut off event, which may increase vehicle emissions.

In one example, the issues described above may be addressed by a method comprising: increasing a temperature of an emission control device before a transient fuel shut-off (TFSO) event of an engine via a first cylinder valve adjustment and a first spark timing adjustment; and increasing the temperature of the emission control device before an auto-stop event of the engine via a second cylinder valve adjustment and a second spark timing adjustment, different than the first cylinder valve adjustment and the first spark timing adjustment. In this way, the temperature of the emission control device may be maintained above an efficient temperature once combustion is resumed in the engine.

As one example, the first cylinder valve adjustment and the first spark timing adjustment may be more aggressive adjustments as compared to the second cylinder valve and the second spark timing adjustments to increase the temperature of the emission control device. For example, more aggressive adjustments include opening an exhaust valve earlier in the first cylinder valve adjustment than the second cylinder valve adjustment, and the first spark timing adjustment may be retarded later than the second spark timing adjustment. By making separate adjustments based on whether the TFSO event or the engine auto-stop event is present, a fuel economy of a vehicle may increase.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for controlling an engine during transient fuel shut off and engine shut down events in order to provide catalyst heating. The engine may be the engine schematically shown in FIG. 1 and may include intake and exhaust valves that are controlled via a continuously variable valve lift (CVVL) system, an example of which is detailed in FIG. 2. As an example, the intake and/or exhaust valve settings may be differently adjusted via the CVVL system when combustion is requested compared to when catalyst heating is requested during an engine shut down of a stop-start event or during a transient fuel shut off event, such as according to the example method of FIGS. 3A and 3B. Further, an amount of catalyst heating requested may vary based on a predicted cooling amount that will occur while the engine is unfueled. FIG. 4 shows a prophetic example timeline for adjusting engine operating parameters, including the intake and/or exhaust valve settings and a spark timing, during different transient fuel shut off and engine shutdown events.

Figure 1:
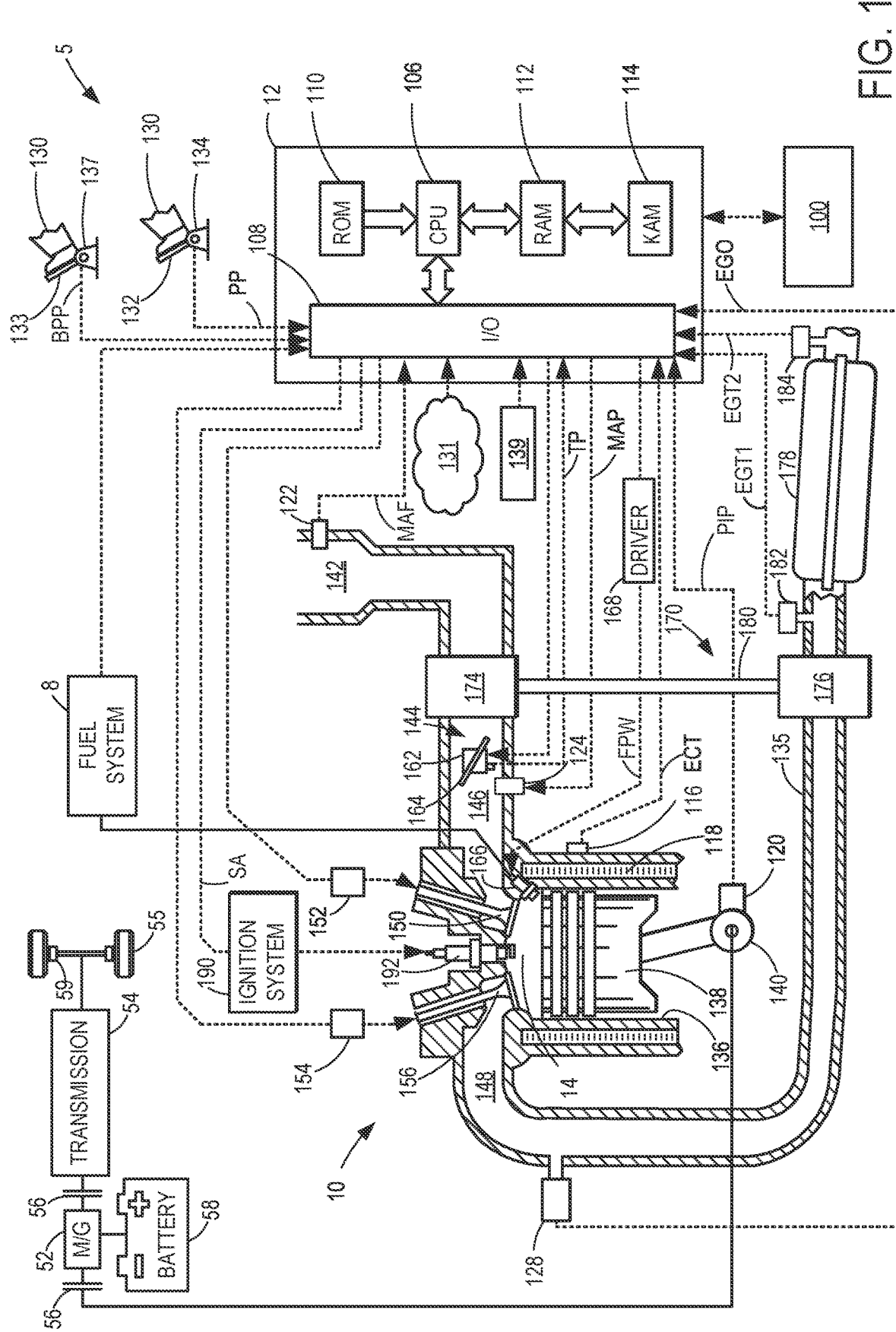
FIG. 1 schematically depicts an example cylinder of an internal combustion engine.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an accelerator pedal 132 and an accelerator pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. As used herein, the phrases "rotating the engine" and "spinning the engine" refer to crankshaft 140 rotating about its central axis. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator.

Vehicle wheels 55 may include mechanical brakes 59 to slow the rotation of vehicle wheels 55. Mechanical brakes 59 may include friction brakes, such as disc brakes or drum brakes, or electromagnetic (e.g., electromagnetically-actuated) brakes, for example, both friction brakes and electromagnetic brakes configured to slow the rotation of vehicle wheels 55, and thus the linear motion of vehicle 5. As an example, mechanical brakes 59 may include a hydraulic brake system comprising brake calipers, a brake servo, and brake lines configured to carry brake fluid between the brake servo and the brake calipers. Mechanical brakes 59 may be configured such that a braking torque applied to wheels 55 by the brake system varies according to the pressure of brake fluid within the system, such as within the brake lines. Furthermore, vehicle operator 130 may depress a brake pedal 133 to control an amount of braking torque supplied by mechanical brakes 59, such as by controlling the pressure of brake fluid within the brake lines, to slow vehicle 5 and/or hold vehicle 5 stationary. For example, a brake pedal position sensor 137 may generate a proportional brake pedal position signal BPP, which may be used to determine the amount of braking torque requested by vehicle operator 130.

Cylinder 14 of engine 10 can receive intake air via a series of intake passages 142 and 144 and an intake manifold 146. Intake manifold 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger 170, including a compressor 174 arranged between intake passages 142 and 144 and an exhaust turbine 176 arranged along an exhaust passage 135. Compressor 174 may be at least partially powered by exhaust turbine 176 via a shaft 180. In examples where turbocharger 170 is a variable geometry turbocharger (VGT), an effective aspect ratio (or flow area) of exhaust turbine 176 may be varied.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174. A throttle position sensor may be provided to measure a position of throttle plate 164. However, in other examples, engine 10 may not include throttle 162, such as where engine 10 is a diesel engine or a throttle-less gasoline engine.

An exhaust manifold 148 can receive exhaust gases from other cylinders of engine 10 in addition to cylinder 14. An exhaust gas sensor 128 is shown coupled to exhaust manifold 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof. Herein, emission control device 178 will be described as a three-way catalyst, which may be simply referred to as a "catalyst." A first exhaust gas temperature sensor 182 is shown coupled to exhaust passage 135 downstream of exhaust turbine 176 and upstream of emission control device 178, and a second exhaust gas temperature sensor 184 is shown coupled to exhaust passage 135 downstream of emission control device 178. First exhaust gas temperature sensor 182 may measure a temperature of exhaust gases within exhaust passage 135 entering emission control device 178, upstream of emission control device 178 and downstream of turbine 176 (e.g., at an inlet of emission control device 178), and may transmit a corresponding first exhaust gas temperature signal EGT1 to controller 12. Second exhaust gas temperature sensor 184 measures a temperature of exhaust gases leaving emission control device 178 (e.g., at an outlet of emission control device 178) and may transmit a corresponding second exhaust gas temperature signal EGT2 to controller 12. EGT1 and/or EGT2 may be used by controller 12 to determine or infer a temperature of emission control device 178.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown) and/or camshaft position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cylinder deactivation valve control (CDVC), cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system). An example continuously variable valve lift (CVVL) system is described in more detail below with regard to FIG. 2.

As further described herein, intake valve 150 and/or exhaust valve 156 may be deactivated or otherwise adjusted during selected conditions, such as transient fuel shut off. For example, one or more cylinders of engine 10 may be operated unfueled. The number and identity of the cylinders operated unfueled may be symmetrical or asymmetrical, such as by selectively discontinuing fueling to one or more cylinders on only a first engine bank, selectively discontinuing fueling to one or more cylinders on only a second engine bank, or selectively discontinuing fueling to one or more cylinders on each of the first and second engine banks. In the case of transient fuel shut off, the intake valve 150 may be adjusted by the CVVL system to decrease air flow through the engine, as will be elaborated herein with respect to FIGS. 3A and 3B.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, such as where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at or near maximum brake torque (MBT) timing to maximize engine power and efficiency. Alternatively, spark may be provided retarded from MBT timing to create a torque reserve. Controller 12 may input engine operating conditions, including engine speed, engine load, and exhaust gas AFR, into a look-up table and output the corresponding spark timing for the input engine operating conditions, for example. In still another example, controller 12 may adjust the spark timing to increase an amount of heat provided to emission control device 178, as will be elaborated below with respect to FIGS. 3A and 3B.

In some examples, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse-width of signal FPW received from controller 12 via an electronic driver 168. In this manner, fuel injector 166 provides what is known as direct injection (hereafter also referred to as "DI") of fuel into combustion cylinder 14. While FIG. 1 shows fuel injector 166 as a side injector, it may also be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that in an alternative embodiment, fuel injector 166 may be a port injector providing fuel into the intake port upstream of cylinder 14. Further, while the example embodiment shows fuel injected to the cylinder via a single injector, the engine may alternatively be operated by injecting fuel via multiple injectors, such as one direct injector and one port injector. In such a configuration, the controller may vary a relative amount of injection from each injector.

Fuel may be delivered by fuel injector 166 to the cylinder during a single cycle of the cylinder. Further, the distribution and/or relative amount of fuel or knock control fluid delivered from the injector may vary with operating conditions, such as air charge temperature, as described herein below. Furthermore, for a single combustion event, multiple injections of the delivered fuel may be performed per cycle. The multiple injections may be performed during the compression stroke, intake stroke, or any appropriate combination thereof.

Fuel tanks in fuel system 8 may hold fuels of different fuel types, such as fuels with different fuel qualities and different fuel compositions. The differences may include different alcohol contents, different water contents, different octane numbers, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including the signals previously discussed and additionally including a measurement of inducted mass air flow (MAF) from a mass air flow sensor 122; an engine coolant temperature (ECT) from a temperature sensor 116 coupled to a cooling sleeve 118; a profile ignition pickup signal (PIP) from a Hall effect sensor 120 (or other type) coupled to crankshaft 140; throttle position (TP) from the throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, upon receiving a signal from accelerator pedal position sensor 134 or brake pedal position sensor 137 indicating that braking is requested, controller 12 may discontinue fueling to cylinder 14 by discontinuing signal FPW from electronic driver 168 so that fuel is not delivered via fuel injector 166 and may further adjust intake valve 150 and exhaust valve 156 via actuators 152 and 154, respectively.

Controller 12 may be communicatively coupled to other vehicles or infrastructures using appropriate communications technology. For example, controller 12 may be coupled to other vehicles or infrastructures via a wireless network 131, which may comprise Wi-Fi, Bluetooth, a type of cellular service, a wireless data transfer protocol, and so on. Controller 12 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles may be either directly communicated between vehicles or may be multi-hop. In some examples, longer range communications (e.g., WiMax) may be used in place of or in conjunction with V2V or V2I2V to extend the coverage area by a few miles. In still other examples, controller 12 may be communicatively coupled to other vehicles or infrastructures via wireless network 131 and the internet (e.g., the cloud).

Vehicle 5 may also include an on-board navigation system 139 (for example, a Global Positioning System, or GPS). Navigation system 139 may include one or more location sensors for assisting in estimating vehicle speed, vehicle altitude, vehicle position/location, etc. This information may be additionally used by controller 12 to infer engine operating parameters, such as local barometric pressure, as well as elevation changes. As discussed above, controller 12 may further be configured to receive information via the internet or other communication networks. Information received from navigation system 139 may be cross-referenced to information available via the internet to determine local weather conditions, local vehicle regulations, etc. Additionally, navigation system 139 and wireless network 131 may be used by controller 12 to estimate an amount of cooling that may occur to emission control device 178 during a condition when the engine is temporarily unfueled, which will be further elaborated with respect to FIGS. 3A and 3B.

Furthermore, vehicle 5 may include a stop-start system 100. Stop-start system 100 may be used by controller 12 to automatically shut down (e.g., auto-stop or pull down) and automatically restart (e.g., auto-start or pull up) engine 10 during vehicle operation, such as when a pre-determined stop-start condition is satisfied. As an example, controller 12 may be configured to autonomously shut down engine 10 while engine 10 is idling and vehicle 5 is stationary, in what is referred to herein as a static stop-start (SSS). As another example, additionally or alternatively, controller 12 may be configured to autonomously shut down engine 10 while engine 10 is idling and vehicle 5 is in motion, in what is referred to herein as a rolling stop-start (RSS). Once the engine is auto-stopped, controller 12 may restart engine 10 in response to a torque request from vehicle operator 130. Additional conditions for shutting down and restarting the engine for a stop-start will be described below with respect to FIGS. 3A-3B. Stop-start system 100 may be communicatively coupled to controller 12. Alternatively, stop-start system 100 may be omitted, and controller 12 may be configured to directly determine when to shut down and restart engine 10, for example. In still other examples, stop-start system 100 may be included in another engine control unit or powertrain control module that is communicatively coupled to controller 12.

As described above, FIG. 1 shows only one cylinder of a multi-cylinder engine. As such, each cylinder may similarly include its own set of intake/exhaust valves, fuel injector(s), spark plug(s), etc. It will be appreciated that engine 10 may include any suitable number of cylinders, including 2, 3, 4, 5, 6, 8, 10, 12, or more cylinders in various configurations. Further, each of these cylinders can include some or all of the various components described and depicted by FIG. 1.

Figure 2:
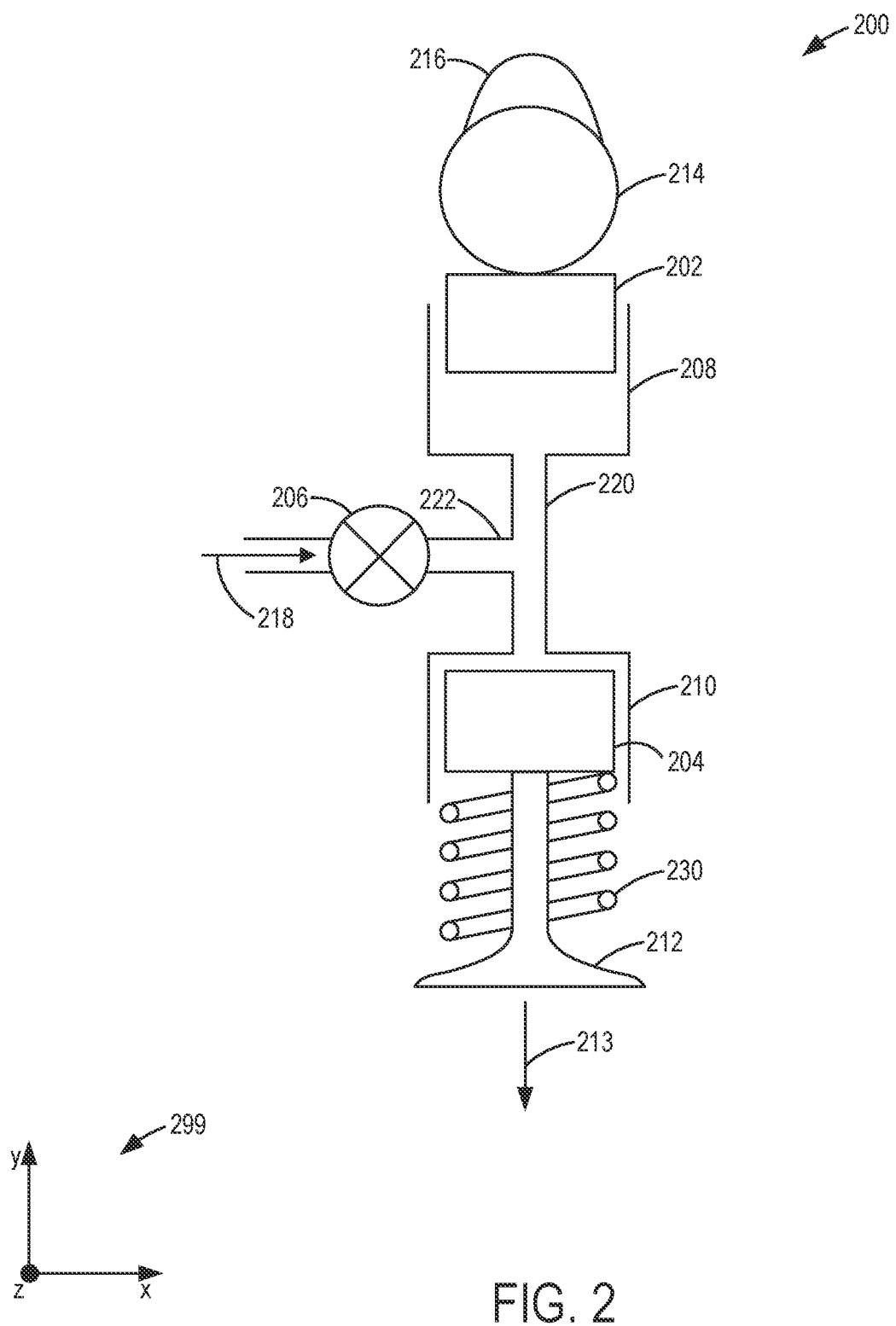
FIG. 2 shows a schematic view of an example continuously variable valve lift mechanism for an engine.

Turning now to FIG. 2, an example CVVL system 200 is schematically shown. CVVL system 200 is a hydraulic valve actuation mechanism and may be included in intake valve actuator 152 and exhaust valve actuator 154 of FIG. 1, for example. Further, FIG. 2 depicts an x-y planar view of CVVL system 200, as shown by reference axes 299. CVVL system 200 hydraulically couples a cam 214 of a camshaft to a valve 212 of a cylinder. Valve 212 may be one of an intake valve and an exhaust valve of a cylinder. In particular, the CVVL system 200 may be configured so that adjusting an amount of hydraulic pressure between the cam 214 and the valve 212 changes an amount of valve lift for valve 212.

As shown in FIG. 2, CVVL system 200 includes a cam piston 202 in a cam cylinder 208 and a valve piston 204 in a valve cylinder 210. Each of the cam cylinder 208 and the valve cylinder 210 may be at least partially filled with hydraulic fluid, and the cam cylinder 208 may be fluidically coupled to the valve cylinder 210 via an inter-cylinder line 220, through which hydraulic fluid may flow. Further, cam 214 may remain in contact with cam piston 202, and an amount of pressure in the cam cylinder 208 may vary based on the position of cam piston 202, which is controlled by the cam 214. Therefore, the pressure is lower at base circle and higher when a lobe 216 of cam 214 is in contact with cam piston 202, with the pressure increasing as the lift of the lobe portion in contact with the cam piston increases, as this further displaces the cam piston in the negative y-direction. This may in turn increase an amount of hydraulic pressure in valve cylinder 210 that is applied to valve piston 204, which may adjust a position of valve 212. When the hydraulic pressure applied to valve piston 204 overcomes an opposing spring force of a valve spring 230, valve 212 may open in a valve lift direction 213. Increasing the amount of hydraulic pressure may cause valve 212 to further move in the valve lift direction 213, resulting in a greater degree of opening (e.g., amount of lift) of valve 212. Valve lift direction 213 is parallel to the y-axis of reference axes 299. In particular, increasing an amount of valve lift for valve 212 includes moving the valve in the negative y-direction, with respect to reference axes 299. When the hydraulic pressure applied to valve piston 204 is less than the spring force of valve spring 230, valve spring 230 may maintain valve 212 closed.

An amount of hydraulic pressure in the CVVL system 200 may be adjusted by adjusting a hydraulic control valve 206, which may be positioned in a hydraulic supply line 222. For example, hydraulic fluid in CVVL system 200 may be provided and refreshed via the hydraulic supply line 222. As one example, hydraulic control valve 206 may be adjustable between a plurality of positions ranging from fully closed (in which flow of the hydraulic fluid through hydraulic control valve 206 is blocked) and fully open (in which a maximum flow area is provided in hydraulic control valve 206). In some examples, hydraulic control valve 206 may be a continuously variable valve, while in other examples, hydraulic control valve 206 may include a finite number of steps or positions. In still other examples, hydraulic control valve 206 may be an on/off valve adjustable between the fully closed position and the fully open position and no positions in between. Further, hydraulic control valve 206 may be an electronically actuated valve that is adjusted in response to (e.g., responsive to) a control signal from an electronic controller, such as controller 12 of FIG. 1, in order to adjust the amount of valve lift of valve 212. Adjusting the amount of valve lift for valve 212 may change one or more cylinder operating parameters by adjusting gas flow to and/or from the cylinder.

Further, by adjusting the hydraulic pressure of CVVL system 200, the valve may be opened or closed at any cam position. For example, increasing the hydraulic pressure of CVVL system 200 (e.g., above an upper threshold pressure) may enable valve 212 to open even when cam 214 is on base circle, and decreasing the hydraulic pressure of CVVL system 200 (e.g., below a lower threshold pressure) may maintain valve 212 closed, even when lobe 216 is in contact with cam piston 202. For example, the hydraulic fluid may apply a force to valve piston 204 that is greater than the spring force of valve spring 230, regardless of the position of cam 214, when the hydraulic pressure is greater than the upper threshold pressure, resulting in valve 212 being open while the hydraulic pressure is maintained above the upper threshold pressure. In contrast, the force applied on valve piston 204 by the hydraulic fluid may be less than the spring force of valve spring 230, even when lobe 216 is at its highest lift, when the hydraulic pressure is less than the lower threshold pressure, resulting in valve 212 being closed while the hydraulic pressure is maintained below the lower threshold pressure. Adjusting the pressure of the hydraulic fluid may facilitate precise adjustments to an opening timing, closing timing, and lift of valve 212. For example, the pressure may be adjusted to any pressure between and including the lower threshold pressure and the upper threshold pressure based on a desired amount of opening or closing of the valve 212 at a given point in an engine cycle.

Note that CVVL system 200 is provided by way of example, and other mechanisms that enable continuously variable valve lift are also possible. By including hydraulic valve mechanisms, such as CVVL system 200 shown in FIG. 2, in an engine system, an amount of valve lift may be continuously varied. CVVL may provide performance increases to the engine, such as decreased emissions and increased fuel efficiency. However, the inventors herein have recognized that CVVL may be advantageously adapted for increasing a temperature of a catalyst prior to a condition where engine fueling is temporarily discontinued and/or to decrease an amount of cooling that occurs while the fueling is temporarily discontinued.

As elaborated above, a catalyst (e.g., emission control device 178 of FIG. 1) decreases an amount of emissions that leave a vehicle. However, during certain engine events where combustion in the engine is temporarily discontinued, such as a transient fuel shut off event and an engine shut down for a stop-start, the catalyst may cool below its light-off temperature. When the catalyst is below its light-off temperature, its ability to treat the emissions is decreased. Therefore, once the transient fuel shut off or engine shut down event has ended, vehicle emissions may be increased. Thus, a method that prevents the catalyst from cooling below its light-off temperature while combustion is discontinued is desired for reducing vehicle emissions.

Figure 3A:
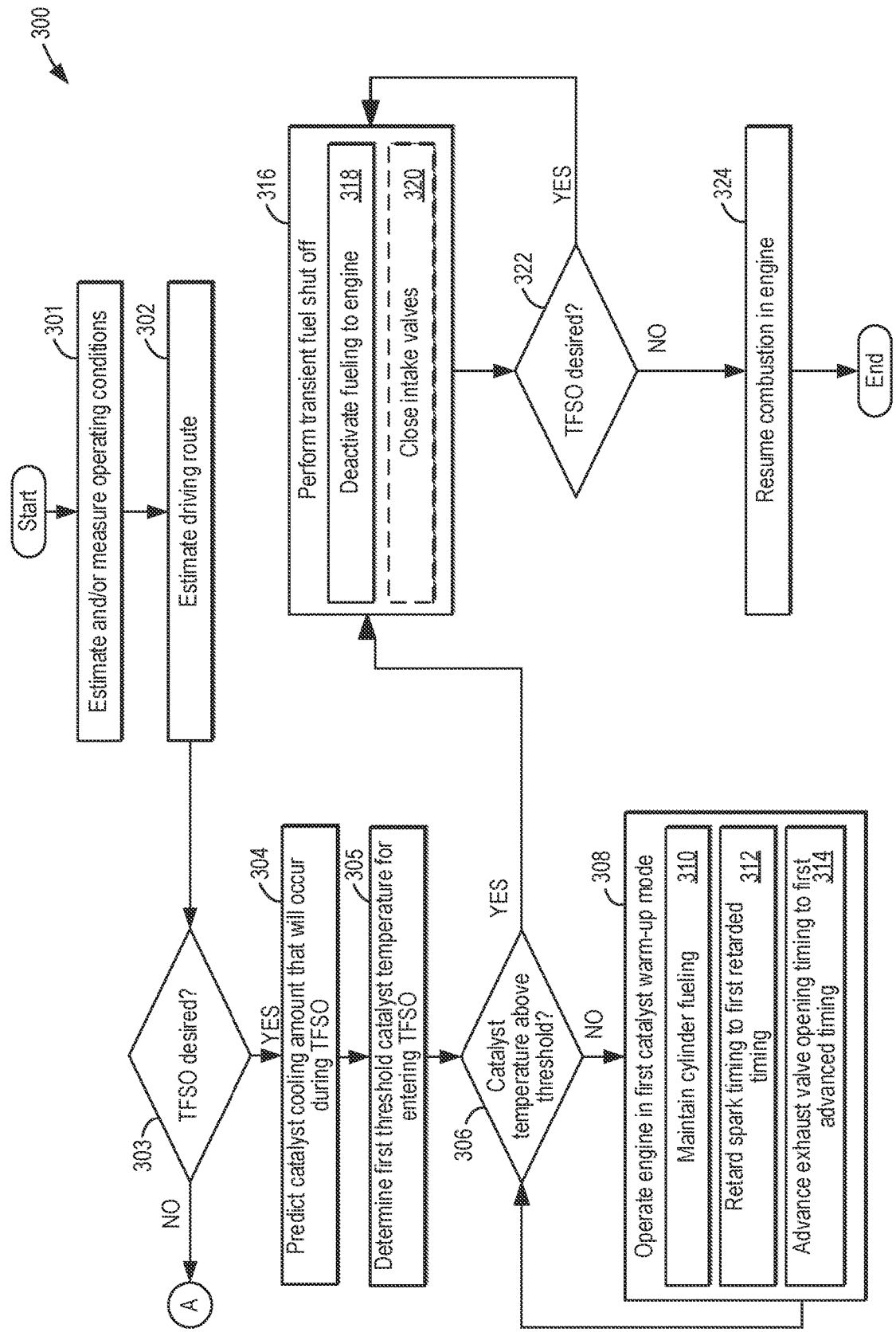
FIGS. 3A and 3B depict a method for catalyst heating during transient fuel shut off and engine shut down events.
Figure 3B:
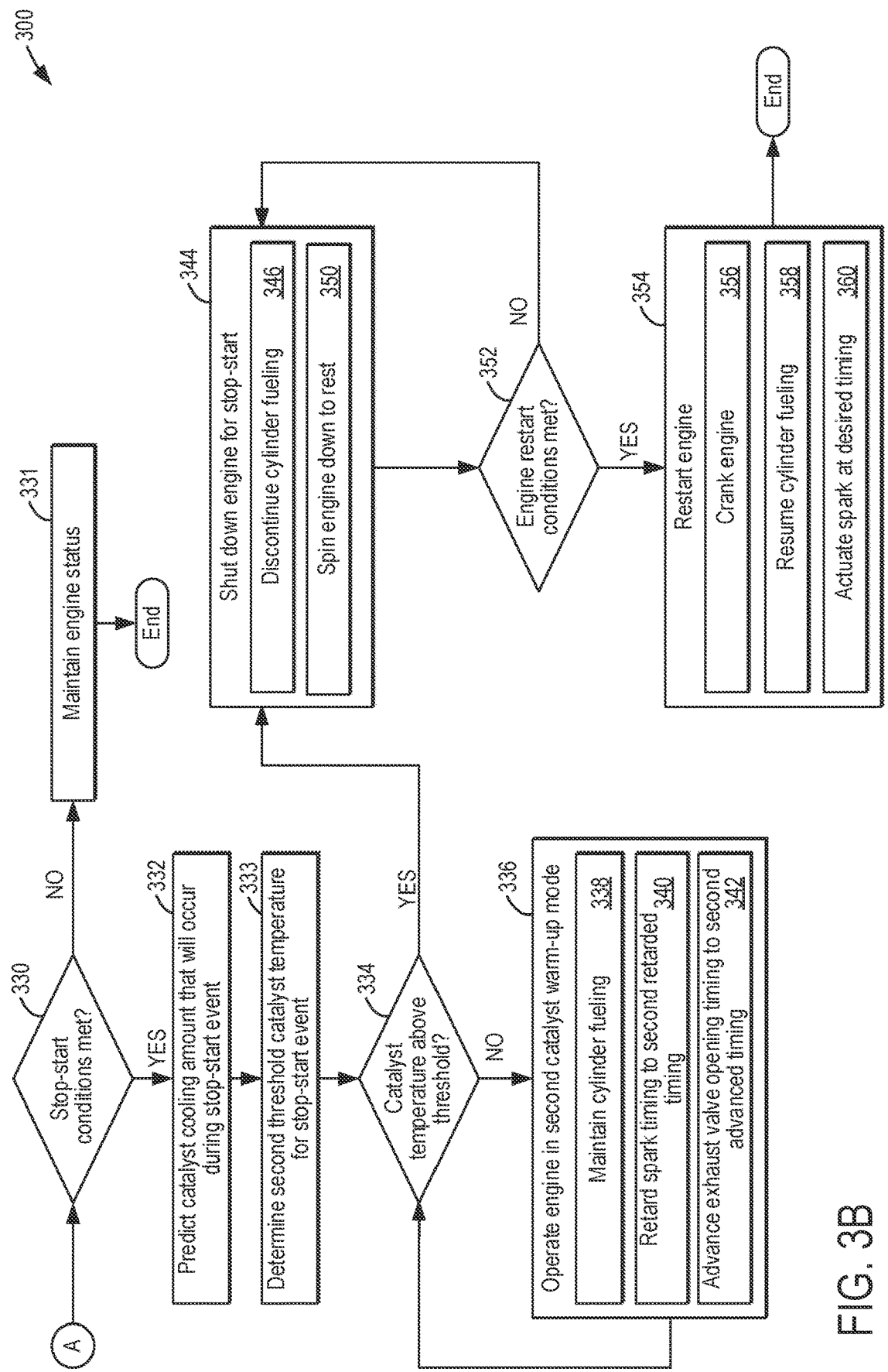
Figure 4:
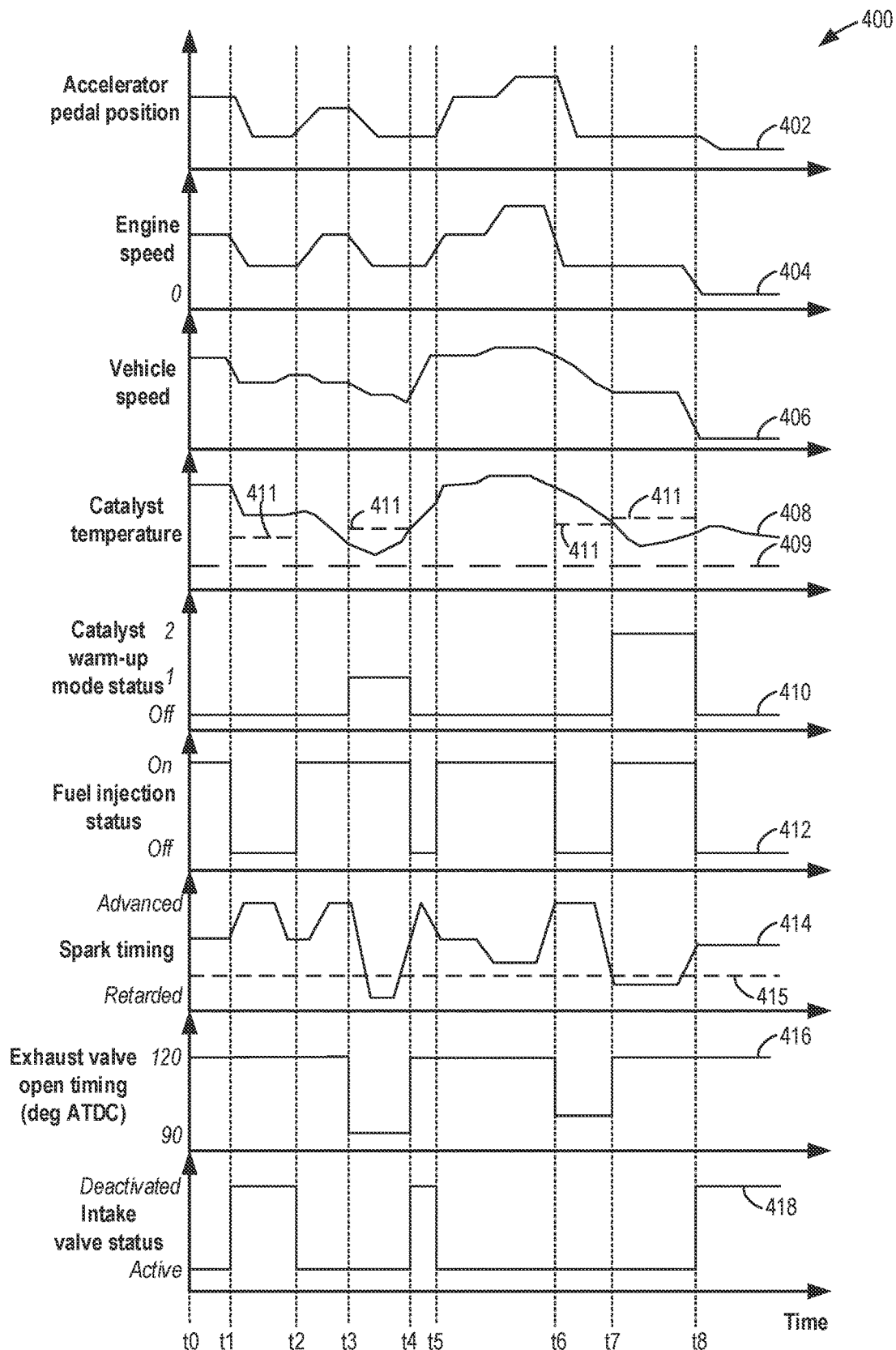
FIG. 4 depicts an example timeline for catalyst warm-up during a transient fuel shut off event and an engine shut down event.

Therefore, FIGS. 3A and 3B show a method 300 for operating an engine to provide catalyst heating prior to a transient fuel shut off event and prior to an engine shut down for a stop-start event. For example, the engine may be engine 10 of vehicle 5 depicted in FIG. 1. As another example, the catalyst may be emission control device 178 of FIG. 1, which may be a three-way catalyst (also referred to as "catalyst"). Instructions for carrying out method 300 may be executed by a controller (e.g., controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation according to the method described below.

At 301, method 300 includes estimating and/or measuring operating conditions. The operating conditions may include, for example, a vehicle speed, an accelerator pedal position, a brake pedal position, a state of charge (SOC) of a system battery (e.g., system battery 58 of FIG. 1), an engine status (e.g., "on," with combustion occurring in engine cylinders, or "off," with combustion discontinued), an engine load, an engine temperature, an engine speed, a driver-demanded torque (e.g., torque demand), cylinder valve lift and timing settings, an exhaust gas temperature, a commanded AFR, a measured AFR, a spark timing, an ambient temperature, etc. The operating conditions may be measured or inferred based on available data. For example, the SOC may be inferred as a percentage charge of a total charge capacity. As a further example, the brake pedal position and the accelerator pedal position may be determined based on signals received from respective pedal position sensors (e.g., brake pedal position sensor 137 and accelerator pedal position sensor 134 of FIG. 1, respectively). Together, the accelerator pedal position and the brake pedal position may be used by the controller to determine the torque demand, which may be a positive torque demand or a negative (e.g., braking) torque demand. As a further example, a catalyst temperature may be inferred based on the exhaust gas temperature, which may be measured by one or more sensors (e.g., first exhaust gas temperature sensor 182 and second exhaust gas temperature sensor 184 shown in FIG. 1).

At 302, method 300 includes estimating a driving route. To estimate the driving route, the controller may utilize a GPS system (e.g., on-board navigation system 139 shown in FIG. 1) and/or a wireless network (e.g., wireless network 131 of FIG. 1), which may communicate with other vehicles and infrastructures, to learn common vehicle routes or use real-time data to make predictions based on those routes that may prompt a fuel cut event, such as transient fuel shut off or engine shut down. For example, a vehicle operator may input a destination within the GPS system, and the GPS system may then create a route. The controller may use the route along with information received by the wireless network to predict conditions of the route. For example, predictions may include predicting common stops (e.g., stops signs, traffic lights, etc.), road grade (e.g., the road goes uphill or downhill), common areas of high traffic (e.g., increased areas of idling), etc. As another example, the GPS system may track the real-time location of the vehicle without the vehicle operator inputting the destination, and the controller may make route predictions based on frequently travelled routes and/or the currently traveled road.

At 303, method 300 includes determining if transient fuel shut off (TFSO) is desired. As one example, a TFSO event may be desired responsive to the accelerator pedal not being depressed. For example, the vehicle operator may perform a "tip-out" where the accelerator pedal goes from a depressed position to a neutral, non-depressed (or less depressed) position, indicating a rapid decrease in the torque demand. Additionally or alternatively, the TFSO event may be desired responsive to the brake pedal being depressed. For example, based on the accelerator pedal position and the brake pedal position, the controller may determine that the torque demand of the engine is less than a current torque output of the engine, and the TFSO event may be requested in order to decrease the current torque output of the engine to the torque demand (e.g., a desired torque output). As another example, the TFSO event may be desired for engine braking. Further, additionally or alternatively, the TFSO event may be desired based on the estimated driving routes describe above. For example, if the controller predicts the route goes downhill, the controller may anticipate an opportunity for TFSO as the vehicle descends the hill.

In some examples, TFSO may be selectively enabled while the engine speed is greater than a pre-determined non-zero threshold engine speed that is stored in a memory of the controller. At engine speeds below the threshold engine speed, the engine may inadvertently shut down while unfueled. As such, the engine may not enter TFSO operation while the engine speed is less than the threshold engine speed. Further, the engine may exit a TFSO event if the engine speed decreases to the threshold engine speed during TFSO operation, as will be elaborated below with respect to 322.

If transient fuel shut off is desired at 303, method 300 proceeds 304, which includes predicting a catalyst cooling amount that will occur during the TFSO. That is, the controller estimates how much the catalyst is expected to cool once combustion is discontinued in the engine for the desired TFSO event. To predict the catalyst cooling amount, the controller may input the current catalyst temperature (e.g., as currently determined at 301), a predicted length of the TFSO, the ambient temperature, and a requested amount of engine braking (if desired) into a look-up table, algorithm, and/or function (e.g., a temperature decay function) that outputs an estimated amount of catalyst cooling during the TFSO. The length of the TFSO may be predicted by the controller using information received from the GPS and/or the wireless network. For example, the controller may utilize the information received from the GPS and/or the wireless network to estimate the time it will take the vehicle to descend a hill, and thus the controller may estimate a length of time the TFSO may occur during the descent. As the length of time of the TFSO increases, the catalyst cooling amount increases. As another example, a lower ambient temperature may cause the catalyst to cool at an increased rate, increasing the catalyst cooling amount. As a further example, if the transient fuel shut off is desired for engine braking, the catalyst cooling amount may increase as an intake valve is allowed to open and ambient air is pumped through the engine and to the catalyst.

At 305, method 300 includes determining a first threshold catalyst temperature for entering the TFSO. The first threshold catalyst temperature may be determined based on the predicted catalyst cooling amount (e.g., as determined at 304) and a lower temperature threshold. The lower temperature threshold may be a pre-determined, non-zero temperature stored in memory below which the catalyst may not effectively treat emissions from the engine. For example, the lower temperature threshold may be a light-off temperature of the catalyst. As a further example, the lower temperature threshold may be above the light-off temperature to prevent the catalyst temperature from going below the light-off temperature. For example, the lower temperature threshold may be a pre-determined number of degrees or percentage above the light-off temperature to provide a margin of error for catalyst cooling amount predictions. The controller may determine the first threshold catalyst temperature by adding the predicted amount of catalyst cooling to the lower temperature threshold. Thus, the first threshold catalyst temperature for entering the TFSO may be a dynamic threshold having a value that changes based on predictions regarding the specific TFSO event. It may be understood that in other examples, the first threshold catalyst temperature may have a fixed value that is calibrated based on a maximal expected catalyst cooling amount (e.g., a longest expected TFSO during cold ambient conditions with engine braking). However, by dynamically adjusting the first threshold catalyst temperature, fuel economy may be increased by not providing more catalyst heating than the conditions warrant, as will be elaborated below.

At 306, method 300 includes determining if the catalyst temperature is above the first threshold catalyst temperature. For example, the controller may directly compare the current catalyst temperature to the determined first threshold catalyst temperature for entering the TFSO. If the catalyst temperature is not above the first threshold catalyst temperature (e.g., the current catalyst temperature is less than or equal to the first threshold catalyst temperature), method 300 proceeds to 308, which includes operating the engine in a first catalyst warm-up mode. The first catalyst warm-up mode used prior to entering TFSO has different settings from a second catalyst warm-up mode used prior to an engine auto-stop, which will be described with respect to 336. With the catalyst temperature below the first threshold catalyst temperature, it is desired to increase the catalyst temperature before starting TFSO such that after TFSO has ended, the catalyst temperature may be above the lower temperature threshold and may thus treat emissions from the engine efficiently. The first catalyst warm-up mode may include more aggressive operations for increasing the temperature of the catalyst relative to the second catalyst warm-up mode to counteract increased temperature loss that may occur due to pumping air through the engine.

Operating the engine in the first catalyst warm-up mode includes maintaining cylinder fueling, as indicated at 310. For example, while operating the engine in the first catalyst warm-up mode, fuel may be injected into each cylinder by a fuel injector (e.g., fuel injector 166 shown in FIG. 1) in proportion to a fuel pulse-width signal (e.g., FPW1 from FIG. 1) received from the controller. As an example, the fuel may be directly injected into each cylinder by the corresponding fuel injector during a compression stroke of the cylinder via one or more injections. Additionally or alternatively, fuel may be directly injected into each cylinder during an intake stroke of the cylinder. As such, the engine remains fueled while operated in the first catalyst warm-up mode.

Operating the engine in the first catalyst warm-up mode further includes retarding the spark timing to a first retarded timing. The spark timing is dictated by a spark advance signal (e.g., SA signal shown in FIG. 1) sent from the controller to a spark plug (e.g., spark plug 192 shown in FIG. 1) of a given cylinder. For example, retarding the spark timing (e.g., increasing spark retard) may refer to the controller delaying the spark advance signal relative to TDC of the compression stroke of the cylinder. Additionally or alternatively, increasing the spark retard may refer to delaying the spark timing relative to MBT timing. In a further example, increasing spark retard may refer to further retarding the spark timing relative to a nominal timing used when catalyst warm-up is not occurring. As an example, the nominal spark timing may be before TDC of the compression stroke, while the first retarded timing may be after TDC of the compression stroke. For example, the first retarded spark timing may be 10 crank angle degrees after TDC of the compression stroke (e.g., 10 crank angle degrees within the power stroke). In other examples, the first retarded spark timing may be in a range from 10 to 20 crank angle degrees after TDC of the compression stroke.

The spark generated by the spark plug (e.g., in response to the spark advance signal) ignites the injected fuel and air within the cylinder, producing a combustion reaction. By retarding the spark timing, a greater portion of the resulting energy from combustion is released as heat to an exhaust manifold instead of providing kinetic energy to drive down the piston. For example, the gases within the cylinder may be less compressed and the piston may be already moving downward toward BDC when combustion occurs at the retarded spark timing, resulting in lower torque production relative to the nominal timing. The heat released from the combustion reaction increases a temperature of exhaust gases, which may flow from the exhaust manifold to the catalyst, increasing the temperature of the catalyst.

Operating the engine in the first catalyst warm-up mode further includes advancing an exhaust valve opening timing to a first advanced timing, as indicated at 314. During nominal engine operation, for example, an exhaust valve may be actuated opened by an exhaust valve actuator (e.g., exhaust valve actuator 154 of FIG. 1) at a nominal exhaust valve opening timing that occurs near an end of a power stroke of the corresponding cylinder. In some examples, the exhaust valve actuator may be a CVVL system (e.g., CVVL system 200 shown in FIG. 2). For example, the nominal exhaust valve opening timing may be around 120 crank angle degrees after TDC of the power stroke. During operation in the first catalyst warm-up mode, the exhaust valve may be actuated opened earlier within the power stroke than during nominal engine operation. For example, the first advanced timing may be in a range from 80 to 90 crank angle degrees after TDC of the power stroke. Additionally or alternatively, the controller may advance the exhaust valve opening timing from the nominal exhaust valve opening timing by a first amount. The first amount may be in a range of 20 to 50 crank angle degrees, for example.

Opening the exhaust valve early by advancing the exhaust valve opening timing to the first advanced timing may further reduce the amount of torque produced by allowing burning gases to flow into the exhaust manifold instead of expanding within the cylinder to push the piston toward BDC. Further, advancing the exhaust valve opening timing to the first advanced timing may increase the temperature of exhaust gases flowing to the catalyst by further increasing the proportion of combustion energy released as heat instead of being converted to kinetic energy.

Method 300 may return to 306 to determine if operating the engine in the first catalyst warm-up mode has increased the catalyst temperature above the first threshold catalyst temperature. If the catalyst temperature has not been increased above the first threshold catalyst temperature, method 300 returns to 308 to continue operating the engine in the first catalyst warm-up mode until the catalyst temperature has increased above the first threshold catalyst temperature or the TFSO is no longer desired.

Responsive to the catalyst temperature being above the first threshold catalyst temperature while the TFSO is desired, method 300 proceeds to 316 and includes performing the TFSO. Performing the TFSO includes deactivating fueling to the engine, as indicated at 318. For example, fuel is no longer injected into any cylinder of the engine, such as due to the controller discontinuing the fuel pulse width signal to the fuel injector of each cylinder. In this way, fuel economy may be increased because fuel is not used during conditions when combustion is not desired.

In some examples, performing the TFSO includes closing the intake valves, as optionally indicated at 320. For example, the intake valves may be controlled by the CVVL system, which may enable the intake valves to be completely deactivated and maintained closed as the engine rotates. For example, during the TFSO, the engine continues to spin (e.g., the piston of each cylinder continues to move up and down relative to the cylinder head as a crankshaft of the engine rotates about its central axis). If the intake and exhaust valves open and close, cool air (e.g., ambient air with a temperature below that of combustion gases) will be inducted into the cylinders and exhausted from the cylinders, resulting in the engine pumping the air to the catalyst. As such, the catalyst may be cooled by the pumped air. By maintaining the intake valves closed, cool air may not be inducted into the cylinders, and thus the air will not be pumped through the engine to the catalyst.

Alternatively, in some examples, the intake valve may be opened during the intake stroke while the TFSO is occurring when engine braking is desired, and 320 may be omitted. For example, operating the intake and exhaust valves during engine braking may create pumping losses, which contribute to slowing the engine and the vehicle.

At 322, method 300 includes determining if the TFSO continues to be desired. For example, the TFSO may no longer be desired when the conditions for operating in the TFSO are no longer met, such as the conditions described above at 303. For example, the vehicle operator may perform a "tip-in" where the accelerator pedal goes from an undepressed (or less depressed) position to further depressed position, indicating a rapid increase in the torque demand.

Additionally or alternatively, the controller may determine that the torque demand of the engine is greater than the current torque output of the engine based on the accelerator pedal position and the brake pedal position, and combustion may be requested in order to increase the current torque output of the engine to meet the torque demand. Additionally or alternatively, the TFSO event may no longer be desired based on the estimated driving routes describe above. For example, if the controller predicts the route is beginning a hill ascent, the controller may anticipate an increased demand for engine torque.

In still other examples, additionally or alternatively, the TFSO may no longer be desired in response to the engine speed decreasing to the pre-determined non-zero threshold engine speed below which inadvertent engine shutdown may occur. In some examples, additionally or alternatively, the TFSO may no longer be desired if the temperature of the catalyst decreases below the lower temperature threshold. For example, the controller may exit the TFSO operation in response to the temperature of the catalyst decreasing below the lower threshold temperature in order to prevent the catalyst temperature from dropping below the light-off temperature. Thus, in some examples, the controller may exit the TFSO operation even while torque is not demanded in order to reduce vehicle emissions upon resuming combustion.

If the TFSO continues to be desired, such as when the conditions for the TFSO continue to be met and/or conditions for exiting the TFSO are not met, method 300 returns to 316 to continue operating the engine in the TFSO. If instead the TFSO is no longer desired, such as due to the conditions for operating in the TFSO not being met and/or the conditions for exiting the TFSO being met, method 300 proceeds to 324 and includes resuming combustion in the engine. Resuming combustion includes opening intake and exhaust valves to provide fresh air for combustion and to exhaust combusted gas, respectively, fueling each cylinder, and providing a spark via a spark plug to initiate combustion of the fuel and air. For example, the exhaust valve may be actuated open at the nominal exhaust valve opening timing, which is less advanced than the first advanced timing used while operating the engine in the first catalyst warm-up mode. In some examples, the engine may be temporarily operated with a rich AFR, such as when air was pumped through the catalyst during the TFSO, in order to rebalance the catalyst. Further, the spark timing may be less retarded than while operating the engine in the first catalyst warm-up mode.

Method 300 may then end. For example, method 300 may be repeated at a pre-determined frequency during vehicle operation. As another example, method 300 may be repeated responsive to a detected change in one or more operating conditions, such as detected by a change in an output of the pedal position sensors, for example.

Returning to 303 of method 300, if the TFSO is not desired, method 300 continues to 330 and includes determining if stop-start conditions are met. For example, an engine shutdown may be requested for an idle-stop, wherein the engine is shut down while the vehicle remains on and at rest (e.g., for a static stop-start) or coasting (e.g., for a rolling stop-start). The stop-start conditions may include, for example, the battery SOC being above a threshold SOC, the brakes being applied, the engine operating at idle speed, and the driver-demanded torque being less than a threshold torque. For example, the threshold SOC may be a battery charge level below which the battery may not be able to support or execute additional vehicle functions while the engine is off and/or may be unable to restart the engine. As one non-limiting example, the threshold SOC is 30%. The threshold torque may be a torque amount corresponding to a neutral (e.g., undepressed) accelerator pedal position.

As another example, the stop-start conditions may additionally or alternatively include the vehicle speed being less than a threshold speed. The threshold speed may vary based on whether the stop-start requested is the static stop-start or the rolling stop-start. For example, the threshold vehicle speed may be lower (e.g., in a range from 0-5 mph) when the stop-start is request for the static stop-start and higher (e.g., in a range from 10-40 mph) when the stop-start is requested for the rolling stop-start. As still another example, the stop-start conditions may include the engine idling for longer than a threshold duration. The threshold duration refers to a non-zero time duration, such as a duration in a range from 1-10 seconds. The stop-start may further include the engine currently being on (and not already off).

All of the stop-start conditions for the corresponding stop-start request (e.g., static stop-start or rolling stop-start) may be confirmed for an engine shutdown to be initiated. Shutting down the engine both for the static stop-start and the rolling stop-start may be referred to herein as an engine auto-stop, as the engine is shut down automatically by the controller and without a request from the driver.

If, at 330, the stop-start conditions are not met, method 300 includes maintaining the engine status at 331. For example, if the engine is on, fuel and spark will continue to be provided to the engine cylinders to produce combustion torque. If the engine is off, fuel and spark will remain disabled so that combustion does not occur in the engine cylinders. Following 331, method 300 ends.

If, at 330, the stop-start conditions are met, method 300 continues to 332, which includes predicting a catalyst cooling amount that will occur during the stop-start event. The catalyst cooling amount that will occur during the stop-start event is a second catalyst cooling amount that is different than the (first) catalyst cooling amount that will occur during the TFSO event (e.g., as determined at 304). The controller may determine the catalyst cooling amount that will occur during the stop-start based on the current catalyst temperature (e.g., as currently determined at 301) and the ambient temperature. For example, heat transfer will occur between the catalyst and the ambient environment while the engine is off for the stop-start, and thus the catalyst temperature will shift toward the ambient temperature. Therefore, the catalyst cooling amount may be determined using a temperature decay function, which may be define the catalyst temperature as a function of time. As such, the catalyst cooling may be non-linear (e.g., exponential), as an instantaneous rate may be greater when a difference between the current catalyst temperature and the ambient temperature is greater.

There may be a greater amount of uncertainty regarding how long the engine will be shut down for the stop-start compared with the TFSO event described above with respect to FIG. 3A. Therefore, as one example, the controller may input an average engine-off duration during a stop-start event into the temperature decay function to determine the catalyst cooling amount. For example, the controller may track the engine-off duration during every stop-start event and update the average (and longest) engine-off duration accordingly.

At 333, method 300 includes determining a second threshold catalyst temperature for the stop-start event. For example, the second threshold catalyst temperature for the stop-start event is determined differently than the first threshold catalyst temperature for entering the TFSO, such as determined at 305. The second threshold catalyst temperature may be determined by the controller inputting the catalyst cooling amount that is predicted to occur during the stop-start event into a look-up table, algorithm or map, which outputs a positive, non-zero temperature value. The second threshold catalyst temperature for the stop-start event may increase as the predicted catalyst cooling amount for the stop-start event increases. Additionally, the second threshold catalyst temperature is set such that the second threshold catalyst temperature is above the lower threshold temperature to decrease a likelihood of the catalyst temperature decreasing below the lower threshold temperature while the engine is off during the stop-start event. Thus, the second threshold catalyst temperature for the stop-start event may be a dynamic threshold having a value that changes based on, for example, the ambient temperature. It may be understood that in other examples, the second threshold catalyst temperature may have a fixed value that is calibrated based on a maximal expected catalyst cooling amount (e.g., a longest expected engine-off duration during cold ambient conditions). However, by dynamically adjusting the second threshold catalyst temperature, fuel economy may be increased by not providing more catalyst heating than the conditions warrant, as will be elaborated below.

At 334, method 300 includes determining if the catalyst temperature is above the second threshold catalyst temperature, similar to 306. For example, the controller may compare the current catalyst temperature to the second threshold catalyst temperature determined at 333.

If the catalyst temperature is not above the second threshold catalyst temperature, method 300 proceeds to 336 and includes operating the engine in a second catalyst warm-up mode. Before the controller enables engine shut down for the stop-start, because the catalyst temperature is below the second threshold catalyst temperature, it is desired to heat the catalyst to maintain the catalyst at a temperature efficient for burning emissions upon engine restart. Additionally, since air is not pumped through the engine during engine shut down, as the engine is not spinning, the catalyst cools at a slower rate than during the TFSO. As such, the second catalyst warm-up mode may be less aggressive for heating the catalyst than the first catalyst warm-up mode. For example, the spark may not be as retarded and/or the exhaust valve may not be opened as early as during the first catalyst warm-up mode.

Operating the engine in the second catalyst warm-up mode includes maintaining cylinder fueling, as indicated at 338. For example, fuel is continued to be used for combustion, as described above at 310.

Operating the engine in the second catalyst warm-up mode further includes retarding the spark timing to a second retarded timing, as indicated at 340. Similar to the manner described above at 312, the spark advance signal may be retarded such that the spark within the cylinder may occur after TDC of the power stroke. However, the second retarded timing may be less retarded than the first retarded timing used during the first catalyst warm-up mode. For example, the second retarded spark timing may be within a range from 0 to 10 crank angle degrees after TDC.

Operating the engine in the second catalyst warm-up mode additionally includes advancing the exhaust valve opening timing to a second advanced timing. Similar to the manner described above at 314, the exhaust valve is opened earlier within the power stroke than during nominal engine operation. However, because air is not pumped through the engine during engine shutdown, the second advanced timing may be less advanced than the first advanced timing used during the first catalyst warm-up mode. For example, the second advanced timing may be in a range from 90 to 100 crank angle after TDC of the power stroke, and the exhaust valve may be actuated open by the CVVL system at the second advanced timing.

Method 300 returns to 334 to determine if the catalyst temperature is above the second threshold catalyst temperature. If the catalyst temperature remains below the second threshold catalyst temperature, catalyst warm-up may be further desired to increase the temperature of the catalyst and method 300 may return to 336 to continue operating the engine in the second catalyst warm-up mode. If instead the catalyst temperature is above the second threshold catalyst temperature at 334, method 300 proceeds to 344 and includes shutting down the engine for the stop-start.

Shutting down the engine for the stop-start includes discontinuing cylinder fueling, as indicated at 346. Fueling may be discontinued in the manner described above at 318. For example, the FPW signal to the fuel injector of each cylinder may be discontinued by the controller, and, as such, the cylinder may no longer be fueled.

Shutting down the engine for the stop-start further includes spinning the engine down to rest, as indicated at 350. Spinning down the engine is also referred to herein as pulling down the engine. With the engine unfueled and combustion discontinued in the engine, the engine is spun to rest (e.g., a speed of zero). Intake and exhaust valves may remain active until the engine is at rest, at least in some examples. As such, prior to the pull down, the engine may be combusting fuel and spinning at a non-zero engine speed, and then during the pull down, combustion of fuel in the engine is discontinued and the engine speed decreases to zero.

At 352, method 300 includes determining if engine restart conditions are met. In one example, the engine restart conditions for the stop-start event may include an increase in the driver-demanded torque. For example, the controller may determine that there is an increase in the driver-demanded torque responsive to the brake pedal being released and/or the accelerator pedal being depressed. As another example, the engine restart conditions may include the SOC of the battery decreasing below the threshold SOC introduced above at 330. The engine restart conditions may also include an electrical load of the vehicle being above a predetermined threshold load. For example, an engine restart may be requested in response to the electrical load of the vehicle being above the threshold load to reduce draining of the battery. In one example, the electrical load may comprise electrical power usage by user-operated accessory devices, an electrically powered air conditioning, etc. The engine restart may be requested responsive to one of the engine restart conditions being present. That is, one, some, or all of the engine restart conditions may be met for the engine restart to be initiated.

If it is determined that the engine restart conditions have not been met, such as when none of the engine restart conditions is present, method 300 returns to 344 so that the engine may be maintained in the shutdown condition and combustion may not be resumed. If it is determined that engine restart conditions are met (e.g., at least one of the engine restart conditions is met), method 300 proceeds to 354 and includes restarting the engine. Restarting the engine includes cranking the engine, as indicated at 356. For example, the engine may be cranked to a non-zero speed with an electric motor (e.g., electric machine 52 of FIG. 1 or another dedicated starter motor) before initiating combustion in the engine cylinders via fuel delivery and spark, as will be elaborated below. Once combustion is resumed, the electric motor may be disengaged.

Restarting the engine further includes resuming cylinder fueling, as indicated at 358. In some examples, fuel may be directly injected to each cylinder before engine rotation to provide direct start assist. Further, the fuel timing may be advanced or retarded relative to crankshaft angle at which fuel was delivered to the engine prior to the engine shutdown for the stop-start.

At 360, method 300 includes actuating the spark plug at a desired timing. The desired timing may be an optimal spark ignition timing once the engine is started and the engine is able to accommodate changes in torque demand. As the engine speed increases, the spark timing may be further advanced to maintain a high torque output. Method 300 may then end.

In this way, a catalyst temperature may be maintained above a temperature threshold during transient fuel shut-off and during engine shut down for a stop-start event. The temperature threshold may be a dynamic threshold that changes based on various vehicle conditions, such as a current catalyst temperature, an ambient temperature, road and route conditions, an amount of engine braking desired, etc. Allowing the temperature threshold to change based on the vehicle conditions increases the effectiveness of catalyst heating by decreasing the probability of the catalyst dropping below its light-off temperature while combustion is temporarily discontinued during the TFSO or the stop-start event. If the catalyst temperature is below the threshold temperature, the controller may operate the engine in a first catalyst warm-up mode before transient fuel shut off or in a second catalyst warm-up mode before engine shut down occurs for the stop-start. Thus, the catalyst temperature may be increased to be above the threshold temperature. During both the first and second catalyst warm-up modes, fuel is continued to be injected for combustion, a spark timing is retarded to increase an amount of heat provided to the catalyst, and an exhaust valve is opened earlier within a power stroke to further increase the amount of heat provided to the catalyst. Thus, exhaust gases may heat the catalyst, and engine emissions may be reduced after the transient fuel shut off or the stop-start event occurs by maintaining the catalyst above its light-off temperature. Further, catalyst heating within the first catalyst warm-up mode may include engine adjustments to increase catalyst heating more aggressively as compared to the second catalyst warm-up mode. As a result, the catalyst may be at an efficient temperature for treating emissions from the engine once combustion in the engine is resumed. Furthermore, by adjusting the temperature the threshold based on operating and road conditions, a fuel economy of the vehicle may be increased as the catalyst may not be heated more than desired.

Turning now to FIG. 4, an example timeline 400 for operating an engine to increase a temperature of a catalyst prior to a transient fuel shut off event and prior to a stop-start event is shown. For example, the engine may be engine 10 of vehicle 5 shown in FIG. 1, and the catalyst may be emission control device 178 shown in FIG. 1. An accelerator pedal position is shown in a plot 402, an engine speed is shown in a plot 404, a vehicle speed is shown in a plot 406, a catalyst temperature is shown in a plot 408, a lower temperature threshold is represented by a dashed line 409, a dynamic temperature threshold is shown in a dashed plot 411, a catalyst warm-up mode status is shown in a plot 410, a fuel injection status is shown in a plot 412, a spark timing is shown in a plot 414, an exhaust valve open timing is shown in a plot 416, and an intake valve status is shown in a plot 418.

For all of the above, the horizontal axis represents time, with time increasing along the horizontal axis from left to right. The vertical axis represents each labeled parameter. For plots 402, 404, 406, and 408, the labeled parameter increases up the vertical axis from bottom to top. For example, in plot 402 the accelerator pedal position increases as the vertical axis increases, such as due to the accelerator pedal being further depressed by a vehicle operator. For plot 410, the vertical axis shows the catalyst warm-up mode status as one of off, in a first mode (indicated by the "1" on the vertical axis), or in a second mode (indicated by the "2" on the vertical axis). For example, the first mode may be the first catalyst warm-up mode describe above with respect to FIGS. 3A and 3B, which is used for heating the catalyst prior to a transient fuel shut-off event. As a further example, the second mode may be the second catalyst warm-up mode also described above with respect to FIGS. 3A and 3B, which is used for heating the catalyst prior to an engine auto-stop. For plot 412, the vertical axis indicates whether the fuel injection status is on or off. For example, when fuel injection status is on, a controller may send a FPW signal (e.g., the signal FPW shown in FIG. 1) to a fuel injector of each cylinder (e.g., fuel injector 166 shown in FIG. 1) to inject fuel into the respective cylinder during the compression stroke. As a further example, when the fuel injection status is off, the controller may discontinue fueling to every cylinder of the engine by discontinuing the FPW signal. For plot 414, the vertical axis indicates the spark timing (e.g., in crank angle degrees) relative to TDC of the compression stroke, represented by a dashed line 415. Thus, spark timings above dashed line 415 are before TDC and within the compression stroke, while spark timings below dashed line 415 are after TDC and within the power stroke. Further, spark timings that are lower with respect to the direction of the vertical axis are more retarded, and spark timings that are higher with respect to the direction of the vertical axis are more advanced, as labeled. For plot 416, the exhaust valve opening timing is shown in crank angle degrees after top dead center (ATDC) of the compression stroke, with the number of crank angle degrees ATDC increasing along the vertical axis from bottom to top. For plot 418, the vertical axis shows whether the intake valve is active or deactivated. For example, if the intake valve is deactivated, the intake valve may be maintained closed by a CVVL system (e.g., CVVL system 200 shown in FIG. 1) throughout a four-stroke engine cycle. As another example, if the intake valve is active, the intake valve may be actuated open to induct air (e.g., during an intake stroke) and then closed throughout the rest of the four-stroke engine cycle.

Additionally, the lower temperature threshold shown by dashed line 409 may be the lower temperature threshold discussed above with respect to FIGS. 3A and 3B, below which the catalyst may not efficiently treat emissions from the engine. The dynamic temperature threshold, shown by dashed plot 411, changes depending on the engine, catalyst, and road conditions, such as elaborated above with reference to FIGS. 3A and 3B.

From time t0 to t1, the accelerator pedal position (plot 402), the engine speed (plot 404), the vehicle speed (plot 406), and the catalyst temperature (plot 408) remain relatively constant. The catalyst temperature is above the lower temperature threshold (dashed line 409), and neither a transient fuel shut-off (TFSO) event nor an engine auto-stop event is requested due to the relatively high accelerator pedal position (plot 402). Because neither a TFSO event nor an engine auto-stop event occurs from time t0 to t1, fuel injection (plot 412) is on so that combustion occurs within the engine, and the catalyst warm-up mode status (plot 410) is "off." The exhaust valve opening timing (plot 416) from t0 to t1 reflects that of nominal engine operation, with the exhaust valve is opened around 120 CAD ATDC of the power stroke. Additionally, the intake valve (plot 418) is opened during the intake stroke and the spark timing remains constant and occurring within the compression stroke from time t0 to t1 (plot 414).

At time t1, a tip-out event occurs, as indicated by the accelerator pedal position (plot 402) decreasing. The vehicle speed (plot 406) and the engine (plot 404) also decrease at time t1 in accordance with the decreased operator demand, and as such, a TFSO event is requested. The dynamic temperature threshold (dashed plot 411) is calculated for entering the TFSO based on a predicted amount of cooling that will occur during the TFSO, such as described above with respect to FIG. 3A. Because the catalyst temperature (plot 408) is above the dynamic temperature threshold at time t1, catalyst warm-up prior to entering the TFSO event is not desired. Therefore, the engine is not operated in either the first the catalyst warm-up mode or the second catalyst warm-up mode (e.g., the catalyst warm-up mode status is maintained "off," as shown in plot 410), and the exhaust valve timing (plot 416) and the spark timing (plot 414) are not adjusted. To operate the engine in the TFSO, the fuel injection status (plot 412) is set to "off" so that fuel is not injected into the engine. Further, the intake valve of every cylinder is deactivated (plot 418), as engine braking is not desired. From time t1 to t2, the catalyst temperature decreases, but does not decrease below the lower temperature threshold (dashed line 409). Additionally, the spark timing is advanced to be at an earlier crank angle degree within the compression stroke. The spark timing may be advanced to decrease knock as the engine transitions from a moderate or heavy load to a lighter load.

Just before time t2, the accelerator pedal position (plot 402) begins to increase, and in response, the TFSO event ends. As such, at time t2, fuel injection (plot 412) is turned "on" so that fuel is delivered to every cylinder of the engine, the spark timing (plot 414) becomes less advanced, and the intake valve of each cylinder (plot 418) is active. As a result of combustion resuming in the engine, the engine speed increases (plot 404).

At time t3, another tip-out event occurs (plot 402), and another TFSO event is desired. In response to the TFSO event being desired, the dynamic threshold temperature (dashed plot 411) is again calculated and determined to be greater than the threshold temperature from time t1 to t2. However, the catalyst temperature (plot 408) is below the dynamic temperature threshold at time t3, resulting in catalyst heating being desired prior to entering the requested TFSO event. In response, the catalyst warm-up mode status (plot 410) is set to the first mode at time t3.

To operate the engine in the first catalyst warm-up mode, the fuel injection (plot 412) remains on, the spark timing (plot 414) is retarded to occur within the power stroke (e.g., at around 10 to 15 crank angle degrees ATDC of the power stroke), and the exhaust valve opening timing (plot 416) is adjusted by the CVVL system to occur at an earlier, more advanced timing (e.g., around 80 to 90 degrees ATDC). Additionally, the intake valve status (plot 418) remains active to provide air for combustion to heat the catalyst. The aggressively retarded spark timing and the aggressively advanced exhaust valve opening timing synergistically increase the temperature of the catalyst prior to entering the TFSO (e.g., versus not operating in the first catalyst warm-up mode).

The engine continues to operate in the first catalyst warm-up mode until the catalyst temperature (plot 408) increases above the dynamic temperature threshold (dashed plot 411) at time t4, at which time the catalyst warm-up mode is set to the "off" status. Because the catalyst temperature is above the dynamic temperature threshold at time t4, the engine enters the second TFSO event. As such, at time t4, fuel injection is turned off (plot 412), the intake valves are deactivated (plot 418), the spark timing is advanced to before TDC of the power stroke (plot 414), and the exhaust valve open timing is changed to approximately 120 crank angle degrees after TDC of the power stroke (plot 416).

At time t5, the TFSO event ends in response to the accelerator pedal position increasing (plot 402). With the TFSO event ending, fuel injection (plot 412) is turned on, the intake valve of each cylinder is activated (plot 418) so that it is open during the intake stroke, and the spark timing is adjusted to occur at a later crank angle degree within the compression stroke than during the TFSO event (plot 414).

At time t6, the accelerator pedal position (plot 402), the engine speed (plot 404), and the vehicle speed (plot 406) decrease. In response to the decreased torque demand, a TFSO event is requested. The dynamic temperature threshold for entering the TFSO event is determined at time t6 (dashed plot 411). Similar to the TFSO event that occurred from time t1 to time t2, the catalyst temperature (plot 408) is above the dynamic temperature threshold at time t6, and so the catalyst warm-up mode (plot 410) is maintained in the "off" status before the TFSO occurs. To enter the TFSO event at time t6, fuel injection (plot 412) is turned off, the spark timing (plot 414) is advanced to an earlier crank angle degree, and the intake valve of each cylinder (plot 418) is deactivated. While in the TFSO event, the catalyst temperature (plot 408) decreases.

At time t7, the TFSO event ends and an engine shut down for a stop-start event is desired. The dynamic temperature threshold is updated using the current catalyst temperature and an ambient temperature as parameters, such as described with respect to FIG. 3B. The catalyst temperature (plot 408) is below the updated dynamic temperature threshold (dashed plot 411) at time t7. Thus, the catalyst warm-up mode (plot 410) is changed from the "off" status to the second catalyst warm-up mode. To operate the engine in the second catalyst warm-up mode at time t7, the fuel injection (plot 412) is turned on, the spark timing (plot 414) is retarded to occur around 0 to 10 degrees after TDC (dashed line 415), the exhaust valve opening timing (plot 416) is advanced to earlier within the power stroke (e.g., at around 90 to 100 crank angle degrees ATDC), and the intake valve of each cylinder is active (plot 418). The engine is operated in the second catalyst warm-up mode until time t8, at which time the catalyst temperature (plot 408) increases above the dynamic temperature threshold (dashed plot 411). In response to the catalyst temperature increasing above the dynamic temperature threshold at time t8, the engine is shut down for the stop-start event. The fuel injection is turned off (plot 412), the spark timing is advanced to occur during the compression stroke (plot 414), the exhaust valve opening timing is delayed to occur around 120 crank angle degrees ATDC (plot 416), and the intake valve of each cylinder deactivates (plot 418) as the engine spins down to rest. The intake valve may be deactivated to reduce catalyst cooling and oxygen saturation in the catalyst, which if not reduced, may cause additional emissions or increased fuel consumption upon start up.

In this way, the catalyst temperature may be maintained above a light-off temperature during events where combustion is temporarily discontinued in the engine, such as during a transient fuel shut-off event or during an engine shut down event for a stop-start. As a result, the catalyst may efficiently catalyze engine emissions once combustion is resumed. Because the catalyst may be cooled at a faster rate during the transient fuel shut-off event as compared to the stop-start event, the engine may be operated in two different modes for catalyst heating prior to combustion being discontinued. For example, the engine may be operated in a first catalyst warm-up mode prior to the transient fuel shut-off event, and the engine may be operated in a second catalyst warm-up mode prior to the stop-start event. The first catalyst warm-up mode may operate the engine more aggressively for catalyst heating by further retarding the spark timing and opening the exhaust valve earlier than the second catalyst warm-up mode. By more aggressively heating the catalyst when more catalyst cooling is expected compared to when less catalyst cooling is expected, fuel consumption may be decreased. Additionally, fuel consumption for operating in either the first catalyst warm-up mode or the second catalyst warm-up mode is further decreased by dynamically adjusting a threshold for entering the respective mode based on a predicted amount of cooling that will occur. Overall, vehicle emissions may be decreased while fuel economy is increased.

The disclosure also provides support for a method, comprising: increasing a temperature of an emission control device before a transient fuel shut-off (TFSO) event of an engine via a first cylinder valve adjustment and a first spark timing adjustment, and increasing the temperature of the emission control device before an auto-stop event of the engine via a second cylinder valve adjustment and a second spark timing adjustment, both different than the first cylinder valve adjustment and the first spark timing adjustment. In a first example of the method, the first cylinder valve adjustment includes opening an exhaust valve of each cylinder at a first advanced timing and the second cylinder valve adjustment includes opening the exhaust valve of each cylinder a second advanced timing that is less advanced than the first advanced timing. In a second example of the method, optionally including the first example, the first spark timing adjustment includes actuating a spark plug of each cylinder at a first retarded timing and the second spark timing adjustment includes actuating the spark plug of each cylinder at a second retarded timing that is less retarded than the first retarded timing. In a third example of the method, optionally including one or both of the first and second examples, increasing the temperature of the emission control device before the TFSO event and increasing the temperature of the emission control device before the auto-stop event are both responsive to the temperature of the emission control device being less than a dynamic temperature threshold. In a fourth example of the method, optionally including one or more or each of the first through third examples, the method further comprises: determining the dynamic temperature threshold in response to receiving a first request for the TFSO event and in response to receiving a second request for the auto-stop event. In a fifth example of the method, optionally including one or more or each of the first through fourth examples, determining the dynamic temperature threshold in response to receiving the first request for the TFSO event and in response to receiving a second request for the auto-stop event comprises determining the dynamic temperature threshold based in part on the temperature of the emission control device and an ambient temperature. In a sixth example of the method, optionally including one or more or each of the first through fifth examples, the ambient temperature is weighted more heavily in determining the dynamic temperature threshold in response to receiving the second request for the auto-stop event than in determining the dynamic temperature threshold in response to receiving the first request for the TFSO event, and wherein the dynamic temperature threshold is greater than a light-off temperature of the emission control device. In a seventh example of the method, optionally including one or more or each of the first through sixth examples, determining the dynamic temperature threshold in response to receiving the first request for the TFSO event further comprises: predicting an amount of cooling for the emission control device during the TFSO event based on an estimated duration of the TFSO event, and determining the dynamic temperature threshold further based on the predicted amount of cooling. In an eighth example of the method, optionally including one or more or each of the first through seventh examples, the estimated duration of the TFSO event is determined based on a driving route. In a ninth example of the method, optionally including one or more or each of the first through eighth examples, increasing the temperature of the emission control device before the TFSO event of the engine via the first cylinder valve adjustment and the first spark timing adjustment comprises: maintaining fueling to the engine and operating the engine with the first cylinder valve adjustment and the first spark timing adjustment until the temperature of the emission control device reaches the dynamic temperature threshold, and discontinuing fueling to the engine to enter the TFSO event in response to the temperature of the emission control device reaching the dynamic temperature threshold. In a tenth example of the method, optionally including one or more or each of the first through ninth examples, increasing the temperature of the emission control device before the auto-stop event of the engine via the second cylinder valve adjustment and the second spark timing adjustment comprises: maintaining fueling to the engine and operating the engine with the second cylinder valve adjustment and the second spark timing adjustment until the temperature of the emission control device reaches the dynamic temperature threshold, and discontinuing fueling to the engine and spinning down the engine in response to the temperature of the emission control device reaching the dynamic temperature threshold.

The disclosure also provides support for a method, comprising: receiving a first request for a entering a fuel cut mode where combustion is temporarily discontinued in an engine at a first time, in response to receiving the first request for entering the fuel cut mode, determining a threshold catalyst temperature for entering the fuel cut mode based on a first predicted catalyst cooling amount during the fuel cut mode, operating with a current catalyst temperature less than the threshold catalyst temperature at the first time, operating the engine in a catalyst warm-up mode at the first time in response to the current catalyst temperature being less than the threshold catalyst temperature, the catalyst warm-up mode including continuing combustion in the engine, and entering the fuel cut mode in response to the current catalyst temperature reaching the threshold catalyst temperature while operating in the catalyst warm-up mode. In a first example of the method, the method further comprises: receiving a second request for a entering the fuel cut mode at a second time, in response to receiving the second request for entering the fuel cut mode at the second time, updating the threshold catalyst temperature for entering the fuel cut mode based on a second predicted catalyst cooling amount during the fuel cut mode, operating with the current catalyst temperature greater than the threshold catalyst temperature at the second time, and entering the fuel cut mode at the second time in response to the current catalyst temperature being greater than the threshold catalyst temperature without operating in the catalyst warm-up mode. In a second example of the method, optionally including the first example, determining the threshold catalyst temperature for entering the fuel cut mode based on the first predicted catalyst cooling amount during the fuel cut mode comprises: estimating a duration of operating in the fuel cut mode, and determining the first predicted catalyst cooling amount during the fuel cut mode based on the estimated duration, the current catalyst temperature, an ambient temperature, and whether intake valves of the engine are active during the fuel cut mode. In a third example of the method, optionally including one or both of the first and second examples, the fuel cut mode is one of a transient fuel shut-off (TFSO) event and an engine auto-stop event. In a fourth example of the method, optionally including one or more or each of the first through third examples, operating the engine in the catalyst warm-up mode comprises advancing an exhaust valve opening timing and retarding a spark timing, and wherein the exhaust valve opening timing is further advanced and the spark timing is further retarded when the fuel cut mode is the TFSO event relative to when the fuel cut mode is the engine auto-stop event.

The disclosure also provides support for a system, comprising: an engine including a cylinder, an emission control device coupled in an exhaust system downstream of the engine, and a controller including executable instructions stored in non-transitory memory that, when executed, cause the controller to: operate the engine in a first warm-up mode to increase a temperature of the emission control device prior to a transient fuel shut-off (TFSO) event, and operate the engine in a second warm-up mode to increase the temperature of the emission control device before an engine auto-stop event, the first warm-up mode including different valve adjustments than the second warm-up mode. In a first example of the system, the system further comprises: an exhaust valve and a spark plug each coupled to the cylinder, and wherein the controller has further instructions in the non-transitory memory to adjust an opening timing of the exhaust valve and a spark timing of the spark plug based on whether the controller is operating the engine in the first or second engine warm-up mode. In a second example of the system, optionally including the first example, the controller has further instructions in the non-transitory memory that includes the opening timing of the exhaust valve being earlier in a four stroke engine cycle while operating in the first warm-up mode than when the controller operates the engine in the second warm-up mode. In a third example of the system, optionally including one or both of the first and second examples, the controller has further instructions in the non-transitory memory that includes the spark timing of the spark plug being later in a four stroke engine cycle while operating in the first warm-up mode than when the controller operates the engine in the second warm-up mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

The technical effect of continuing combustion while retarding a spark timing and advancing an exhaust opening timing before entering a transient fuel shut-off event and before entering an engine auto-stop event is preventing a catalyst temperature from decreasing below a light-off temperature during the transient fuel shut-off event and during the engine auto-stop event.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
increasing a temperature of an emission control device before a transient fuel shut-off (TFSO) event of an engine via a first cylinder valve adjustment and a first spark timing adjustment; and
increasing the temperature of the emission control device before an auto-stop event of the engine via a second cylinder valve adjustment and a second spark timing adjustment, both different than the first cylinder valve adjustment and the first spark timing adjustment.

2. The method of claim 1, wherein the first cylinder valve adjustment includes opening an exhaust valve of each cylinder at a first advanced timing and the second cylinder valve adjustment includes opening the exhaust valve of each cylinder a second advanced timing that is less advanced than the first advanced timing.

3. The method of claim 1, wherein the first spark timing adjustment includes actuating a spark plug of each cylinder at a first retarded timing and the second spark timing adjustment includes actuating the spark plug of each cylinder at a second retarded timing that is less retarded than the first retarded timing.

4. The method of claim 1, wherein increasing the temperature of the emission control device before the TFSO event and increasing the temperature of the emission control device before the auto-stop event are both responsive to the temperature of the emission control device being less than a dynamic temperature threshold.

5. The method of claim 4, further comprising determining the dynamic temperature threshold in response to receiving a first request for the TFSO event and in response to receiving a second request for the auto-stop event.

6. The method of claim 5, wherein determining the dynamic temperature threshold in response to receiving the first request for the TFSO event and in response to receiving a second request for the auto-stop event comprises determining the dynamic temperature threshold based in part on the temperature of the emission control device and an ambient temperature.

7. The method of claim 6, wherein the ambient temperature is weighted more heavily in determining the dynamic temperature threshold in response to receiving the second request for the auto-stop event than in determining the dynamic temperature threshold in response to receiving the first request for the TFSO event, and wherein the dynamic temperature threshold is greater than a light-off temperature of the emission control device.

8. The method of claim 6, wherein determining the dynamic temperature threshold in response to receiving the first request for the TFSO event further comprises:
predicting an amount of cooling for the emission control device during the TFSO event based on an estimated duration of the TFSO event; and
determining the dynamic temperature threshold further based on the predicted amount of cooling.

9. The method of claim 8, wherein the estimated duration of the TFSO event is determined based on a driving route.

10. The method of claim 4, wherein increasing the temperature of the emission control device before the TFSO event of the engine via the first cylinder valve adjustment and the first spark timing adjustment comprises:
maintaining fueling to the engine and operating the engine with the first cylinder valve adjustment and the first spark timing adjustment until the temperature of the emission control device reaches the dynamic temperature threshold; and
discontinuing fueling to the engine to enter the TFSO event in response to the temperature of the emission control device reaching the dynamic temperature threshold.

11. The method of claim 4, wherein increasing the temperature of the emission control device before the auto-stop event of the engine via the second cylinder valve adjustment and the second spark timing adjustment comprises:
maintaining fueling to the engine and operating the engine with the second cylinder valve adjustment and the second spark timing adjustment until the temperature of the emission control device reaches the dynamic temperature threshold; and
discontinuing fueling to the engine and spinning down the engine in response to the temperature of the emission control device reaching the dynamic temperature threshold.

12. A method, comprising:
receiving a first request for a entering a fuel cut mode where combustion is temporarily discontinued in an engine at a first time;
in response to receiving the first request for entering the fuel cut mode, determining a threshold catalyst temperature for entering the fuel cut mode based on a first predicted catalyst cooling amount during the fuel cut mode;
operating with a current catalyst temperature less than the threshold catalyst temperature at the first time;
operating the engine in a catalyst warm-up mode at the first time in response to the current catalyst temperature being less than the threshold catalyst temperature, the catalyst warm-up mode including continuing combustion in the engine; and
entering the fuel cut mode in response to the current catalyst temperature reaching the threshold catalyst temperature while operating in the catalyst warm-up mode.

13. The method of claim 12, further comprising:
receiving a second request for a entering the fuel cut mode at a second time;
in response to receiving the second request for entering the fuel cut mode at the second time, updating the threshold catalyst temperature for entering the fuel cut mode based on a second predicted catalyst cooling amount during the fuel cut mode;
operating with the current catalyst temperature greater than the threshold catalyst temperature at the second time; and
entering the fuel cut mode at the second time in response to the current catalyst temperature being greater than the threshold catalyst temperature without operating in the catalyst warm-up mode.

14. The method of claim 12, wherein determining the threshold catalyst temperature for entering the fuel cut mode based on the first predicted catalyst cooling amount during the fuel cut mode comprises:
estimating a duration of operating in the fuel cut mode; and
determining the first predicted catalyst cooling amount during the fuel cut mode based on the estimated duration, the current catalyst temperature, an ambient temperature, and whether intake valves of the engine are active during the fuel cut mode.

15. The method of claim 12, wherein the fuel cut mode is one of a transient fuel shut-off (TFSO) event and an engine auto-stop event.

16. The method of claim 15, wherein operating the engine in the catalyst warm-up mode comprises advancing an exhaust valve opening timing and retarding a spark timing, and wherein the exhaust valve opening timing is further advanced and the spark timing is further retarded when the fuel cut mode is the TFSO event relative to when the fuel cut mode is the engine auto-stop event.

17. A system, comprising:
an engine including a cylinder;
an emission control device coupled in an exhaust system downstream of the engine; and
a controller including executable instructions stored in non-transitory memory that, when executed, cause the controller to:
operate the engine in a first warm-up mode to increase a temperature of the emission control device prior to a transient fuel shut-off (TFSO) event; and
operate the engine in a second warm-up mode to increase the temperature of the emission control device before an engine auto-stop event, the first warm-up mode including different valve adjustments than the second warm-up mode.

18. The system of claim 17, further comprising an exhaust valve and a spark plug each coupled to the cylinder, and wherein the controller has further instructions in the non-transitory memory to adjust an opening timing of the exhaust valve and a spark timing of the spark plug based on whether the controller is operating the engine in the first or second engine warm-up mode.

19. The system of claim 18, wherein the controller has further instructions in the non-transitory memory that includes the opening timing of the exhaust valve being earlier in a four stroke engine cycle while operating in the first warm-up mode than when the controller operates the engine in the second warm-up mode.

20. The system of claim 18, wherein the controller has further instructions in the non-transitory memory that includes the spark timing of the spark plug being later in a four stroke engine cycle while operating in the first warm-up mode than when the controller operates the engine in the second warm-up mode.

* * * * *